(12) United States Patent
Deutsch

(10) Patent No.: US 8,681,071 B2
(45) Date of Patent: Mar. 25, 2014

(54) LIGHTED MULTIPLE PANEL DISPLAY

(76) Inventor: Daniel Deutsch, New York, NY (US)

( * ) Notice: Subject to any disclaimer, the term of this patent is extended or adjusted under 35 U.S.C. 154(b) by 647 days.

(21) Appl. No.: 11/489,717

(22) Filed: Jul. 20, 2006

(65) Prior Publication Data

US 2007/0171674 A1    Jul. 26, 2007

Related U.S. Application Data

(60) Provisional application No. 60/700,716, filed on Jul. 20, 2005.

(51) Int. Cl.
 *G09G 5/00* (2006.01)

(52) U.S. Cl.
 USPC ....... 345/1.1; 362/125; 362/555; 362/249.01; 362/249.12; 362/351; 362/124.07; 362/124.191; 362/546; 362/800

(58) Field of Classification Search
 USPC ......... 345/1.1, 4–6; 40/124.07, 124.191, 546, 40/800; 362/125, 612, 555, 559, 249.01, 362/249.02, 249.12, 351
 See application file for complete search history.

(56) References Cited

U.S. PATENT DOCUMENTS

| | | | | |
|---|---|---|---|---|
| 3,806,722 A | * | 4/1974 | Peake et al. | 40/444 |
| 4,546,019 A | * | 10/1985 | Schneider | 428/13 |
| 5,013,145 A | * | 5/1991 | Croll | 351/52 |
| 5,410,454 A | * | 4/1995 | Murase et al. | 362/611 |
| 6,253,489 B1 | * | 7/2001 | Sung et al. | 47/65.7 |
| 6,308,444 B1 | * | 10/2001 | Ki | 40/546 |
| 6,474,825 B1 | * | 11/2002 | Saito et al. | 362/604 |
| 6,976,915 B2 | * | 12/2005 | Baker et al. | 463/1 |
| 7,024,809 B1 | * | 4/2006 | Poma | 40/546 |
| 2003/0223236 A1 | * | 12/2003 | Wu | 362/247 |
| 2004/0045199 A1 | * | 3/2004 | Ki | 40/546 |
| 2004/0255497 A1 | * | 12/2004 | Venkataraman et al. | 40/551 |
| 2005/0072032 A1 | * | 4/2005 | McCollum et al. | 40/546 |
| 2006/0242585 A1 | * | 10/2006 | Cutsinger et al. | 715/744 |
| 2008/0066356 A1 | * | 3/2008 | Miller et al. | 40/546 |

* cited by examiner

*Primary Examiner* — William Boddie
*Assistant Examiner* — Sahlu Okebato
(74) *Attorney, Agent, or Firm* — Greenberg Traurig LLP

(57) ABSTRACT

A lighted multiple panel display unit capable of providing a variety of visual effects has layered panels made of light transmitting materials. At least two of the layered panels are spaced apart such that there is a gap between them. Each of the panels comprising a relief. Multiple light sources illuminate at least a portion of the relief of each panel, the light sources being actuated in a predetermined sequence such that the reliefs produce a visual effect. Visual effects which may be produced include a color blending effect, a three-dimensional appearance effect, a morphing effect and a color fading effect.

44 Claims, 13 Drawing Sheets

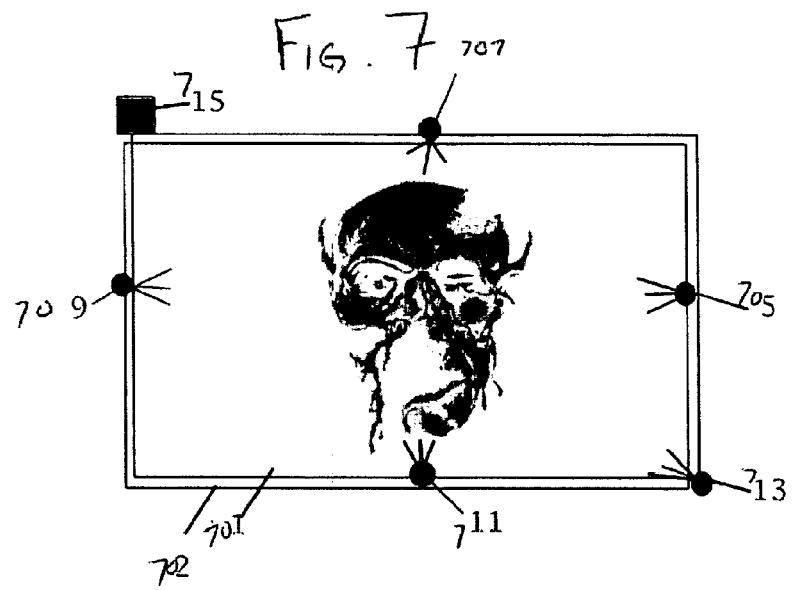
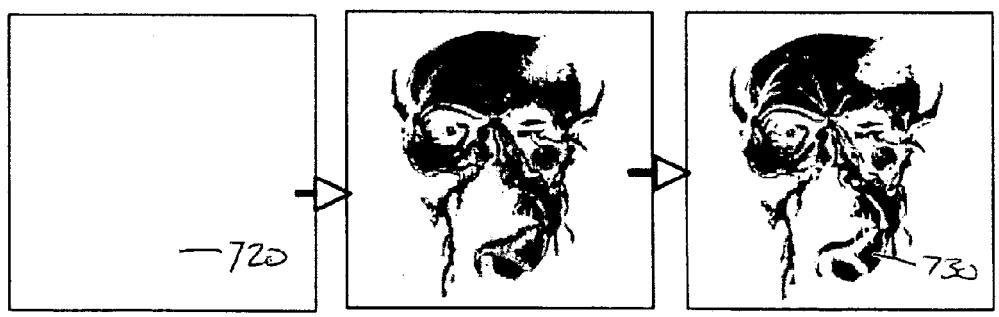
IMAGE 1 FADES IN ---> IMAGE 2 FADES IN OVER IMAGE 1 --->IMAGE 1 FADES OUT, THEN IMG 2
Fig 7A   Fig 7B   Fig 7C

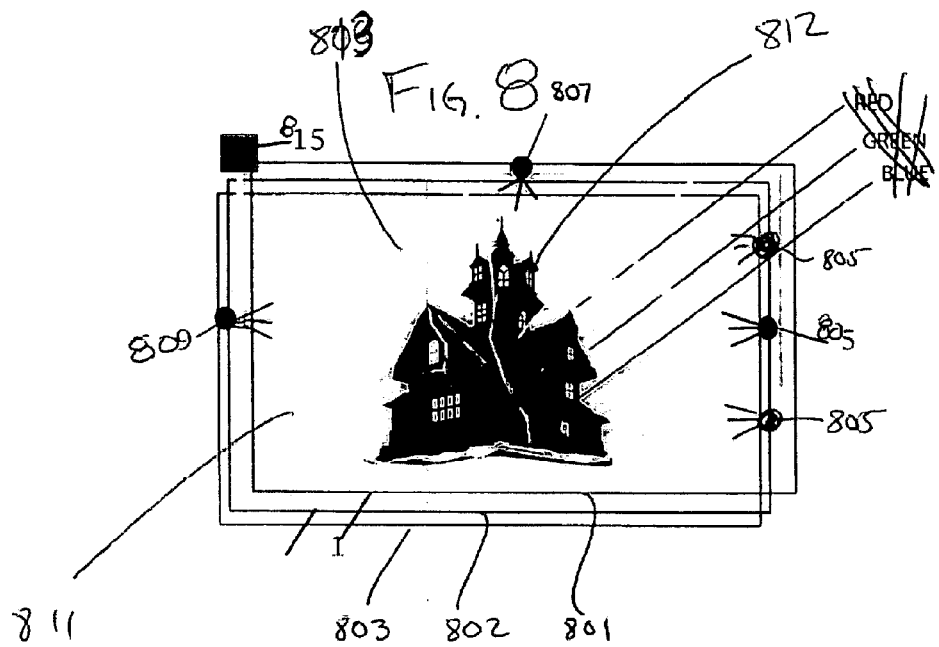
Fig. 8A

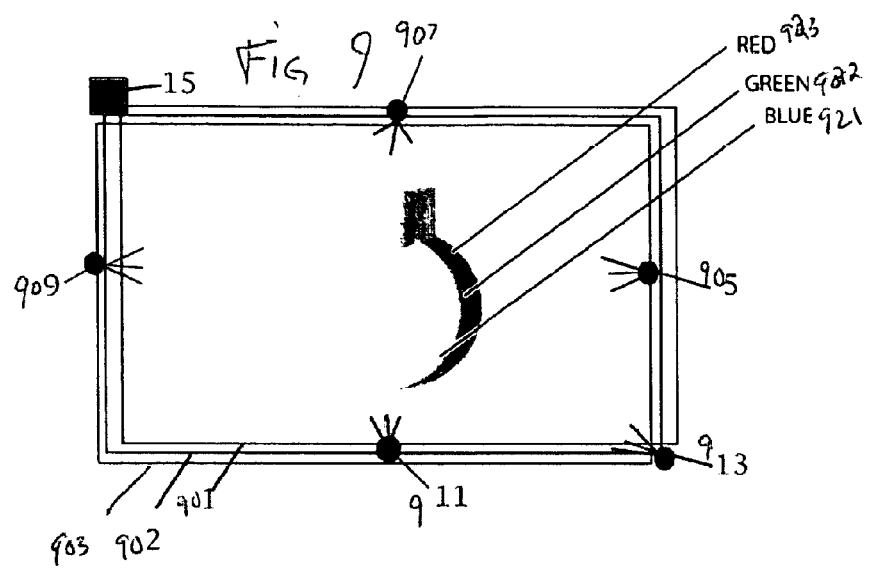
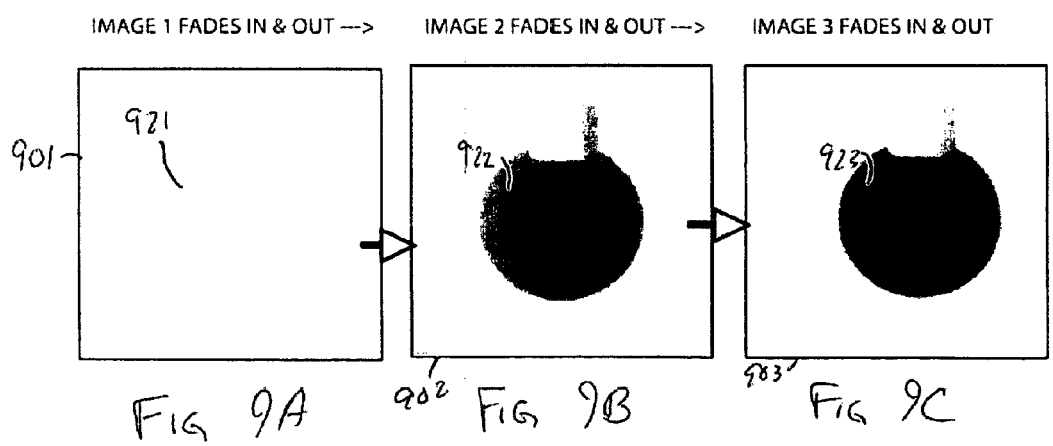

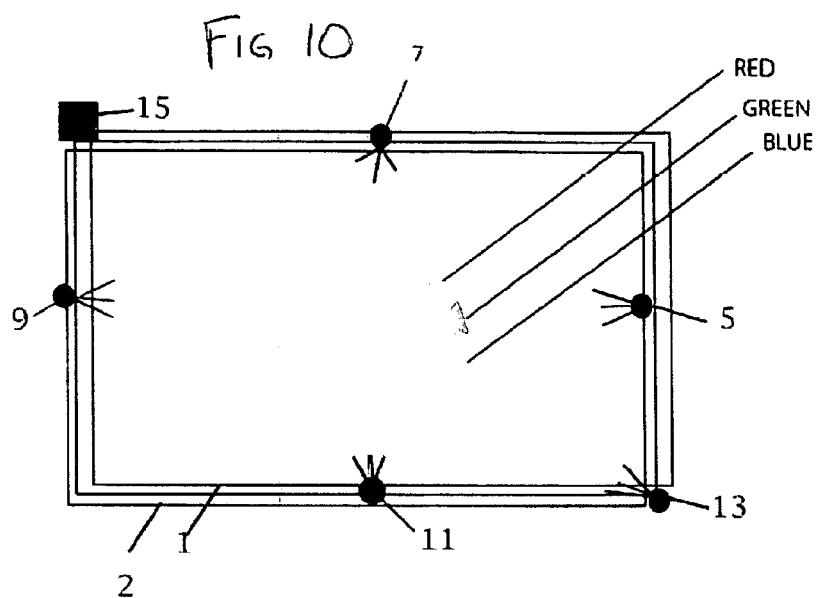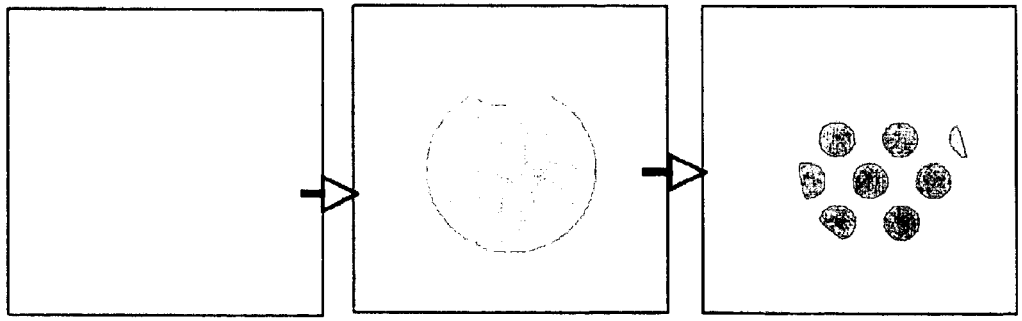

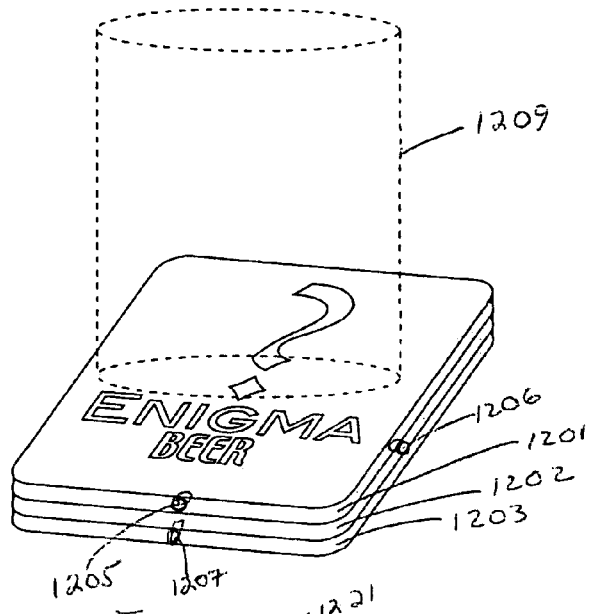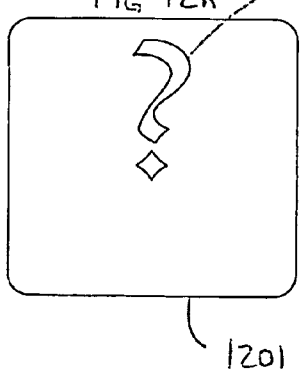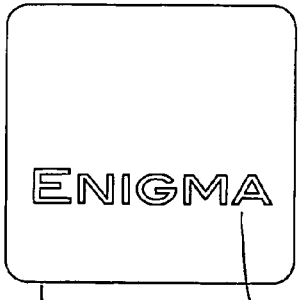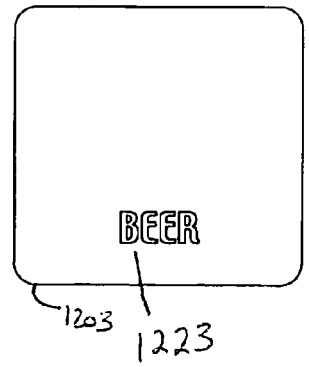

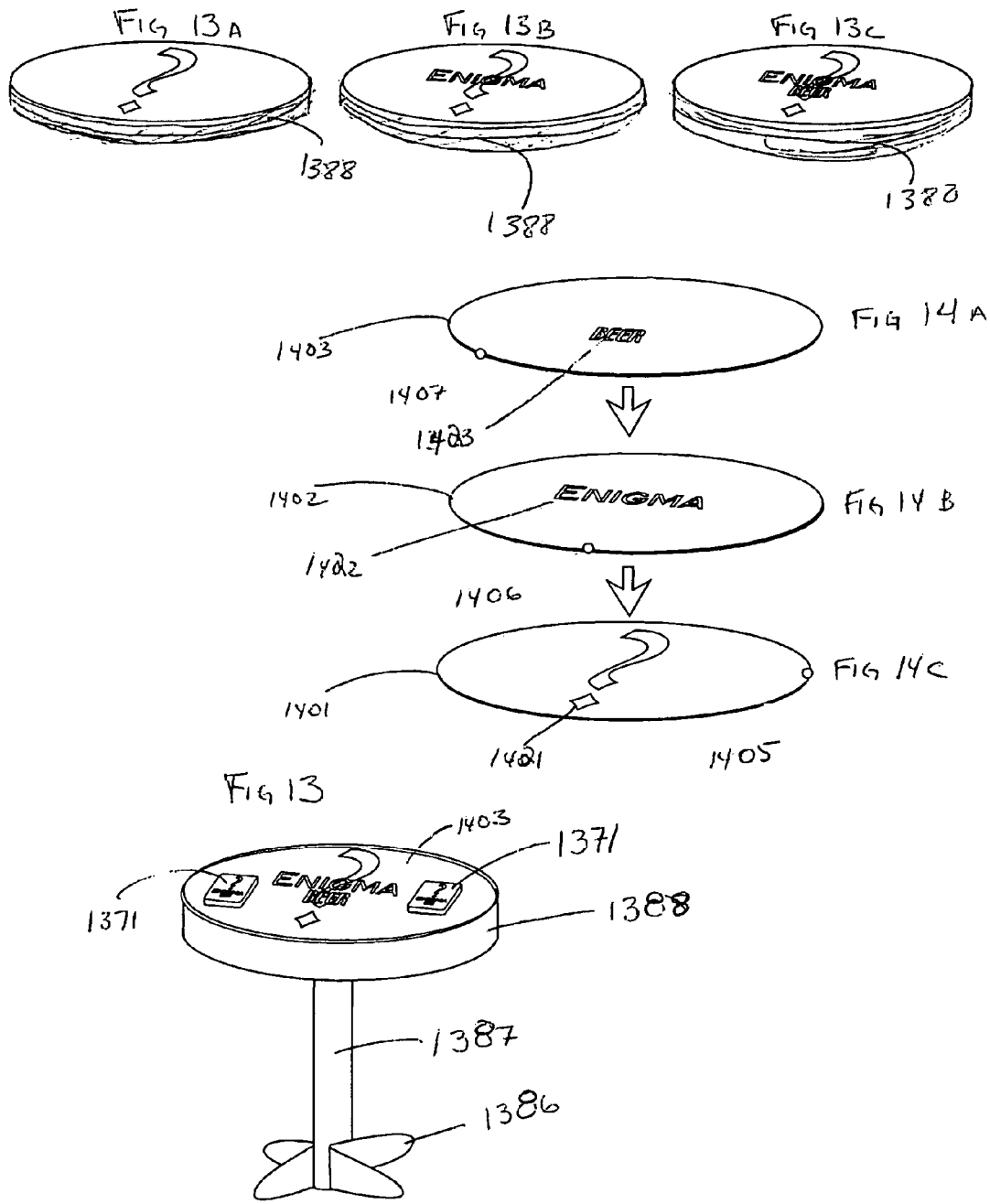

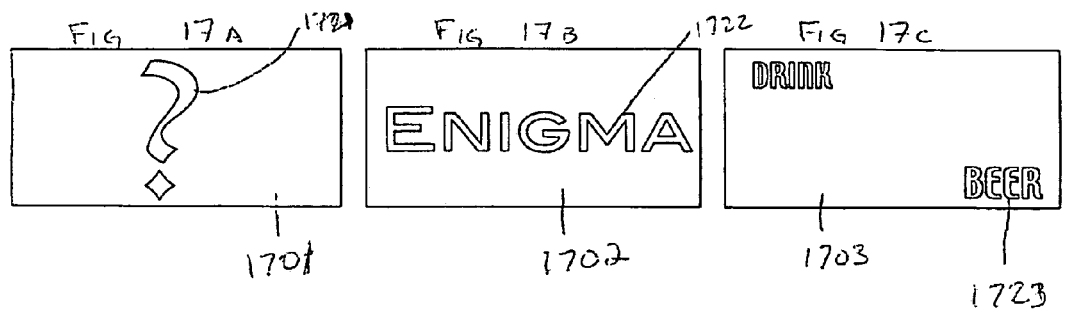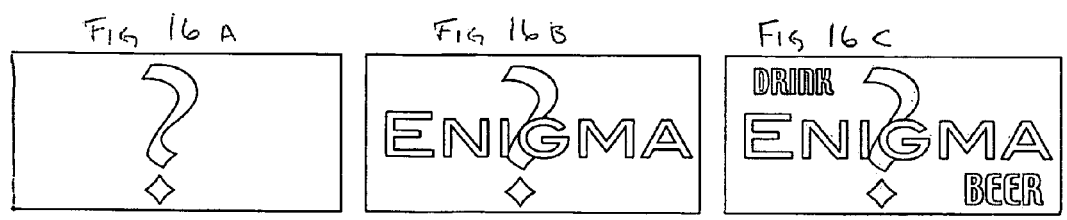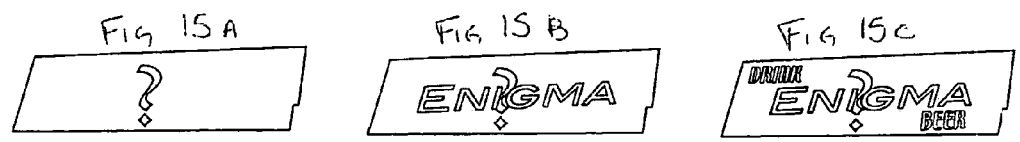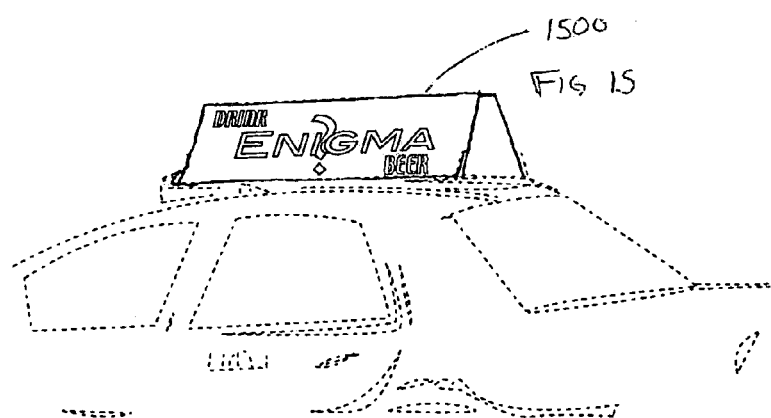

LIGHTED MULTIPLE PANEL DISPLAY

This is a non-provisional application which claims priority to U.S. Provisional Patent Application No. 60/700,716 filed Jul. 20, 2005, the entire disclosure of which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of displays for signage, and in particular to a lighted display which includes a light source and multiple lit panels for producing visual effects.

BACKGROUND OF THE INVENTION

Lighted display units which are known in the art typically use fluorescent lamps that are placed inside a box. The object to be displayed is represented by either the fluorescent lamps themselves or by translucent material which is illuminated from the back by the fluorescent lamps. Such lighted display units can be bulky, heavy, and expensive to manufacture, and require routine maintenance and replacement of lamps since the fluorescent lamps have a fairly limited lifespan. Furthermore, multiple fluorescent lamps are needed to create very limited visual effects, such as limited motion effects or varying shapes or colors.

SUMMARY OF THE INVENTION

The invention in an embodiment provides a lighted display unit that uses light-emitting diodes (LEDs) or other light sources to illuminate multiple vertically layered light-transmitting panels so as to create visual effects. The light-transmitting panels are each etched with a different design, and illumination of individual panels is controlled to create visual effects, including motion, color blending, three-dimensional appearance, highlighting, blinking effects on one or more panels, or random twinkling effects. The light-transmitting panels can be sequentially illuminated so as to display sequential images, sequential coloring, or an image which fades from one color to another within a panel.

In an embodiment, the light-transmitting panels are edge-lit. Edge lighting can be provided in a direction which is substantially parallel to the broad face of the panels, or may be provided in directions which are offset at an angle from such parallel direction. Light sources may be provided at multiple edges of the panels, and sequencing of the lighting from one edge to the next can be used to produce monochrome or color motion effects.

BRIEF DESCRIPTION OF THE DRAWINGS

The foregoing and other objects, features, and advantages of the invention will be apparent from the following more particular description of embodiments as illustrated in the accompanying drawings, in which reference characters refer to the same parts throughout the various views. The drawings are not necessarily to scale, emphasis instead being placed upon illustrating principles of the invention.

FIGS. 7, 7A, 7B and 7C illustrate a morphing effect in accordance with one embodiment of the present invention.

FIGS. 8 and 8A illustrate an embodiment of the invention combination of differing visual effects.

FIGS. 9, 9A, 9B and 9C illustrate an embodiment of the invention fading between colors.

FIGS. 10, 10A, 10B and 10C are further illustrations of an embodiment of the invention combining different visual effects.

FIGS. 12, 12A, 12B, 12C and 12D is yet another embodiment of the present invention for use as a coaster or other horizontal surface.

FIGS. 13, 13A, 13B and 13C is yet another embodiment of the present invention where the display is integrated into a table.

FIGS. 14A, 14B and 14C show individual panels in accordance with an embodiment of the present invention.

FIGS. 15, 15A, 15B, 15C, 16, 16A, 16B and 16C is still another embodiment in accordance with the present invention for use as a mobile or stationary lighted display which may be used in an angular orientation.

FIGS. 17A, 17B and 17C show different individual panels in accordance with an embodiment of the present invention.

DETAILED DESCRIPTION OF VARIOUS EMBODIMENTS

Reference will now be made in detail to various embodiments of the present invention, examples of which are illustrated in the accompanying drawings.

Figure 1:
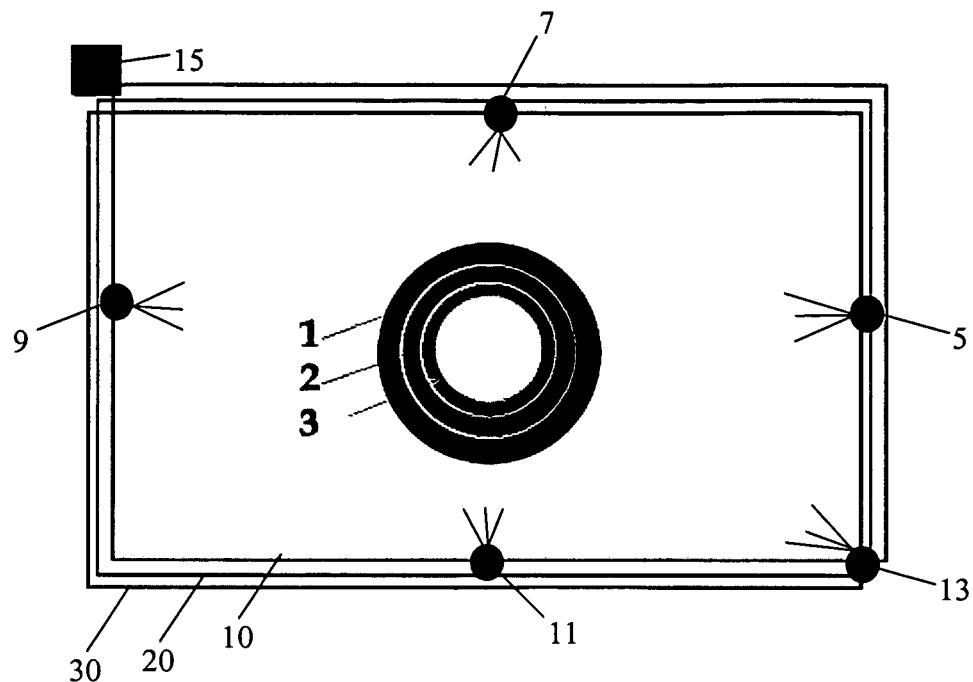
FIG. 1 is a front perspective view showing a lighted display unit in accordance with an embodiment of the invention.

With reference to FIG. 1, a plurality of light-transmitting panels 10, 20, 30 are vertically layered in an adjacent relationship to form a display. The panels may have sufficient width, e.g. 3 mm, to accommodate light source 5, 7, 9, 11, 13 at an edge thereof for illuminating the panels, and may be layered such that the spacing between them is approximately 3 mm. The light-transmitting panels 10, 20, 30 may be of a plastic material formed from sheets or by injection molding, or may comprise glass or any other light transmitting material. In one embodiment, the light-transmitting panels are formed of cast acrylic.

Graphical or textual designs 1, 2, 3 are provided on the respective panels 10, 20, 30 via a negative or positive relief which reflects or scatters light from the light sources 5, 7, 9, 11, 13. This relief may be produced by etching, molding, silk screen, printing on surface, or other known process. The panels can be clipped, screwed, bolted, glued, or welded together. A frame may be provided to finish the outer perimeter of the panels and conceal or direct the light source. The frame can be made of a suitable material, such as plastic or aluminum.

The light sources 5, 7, 9, 11, 13 which illuminate each panel are preferably colored light emitting diodes (LEDs), but other light sources are contemplated and within the scope of the invention, including fiber optic lighting, laser, infrared, ultraviolet, fluorescent bulbs, incandescent bulbs, and ambient light. Actuation of the light sources is controlled by a controller 15, which may be powered by batteries within the unit itself or by an external power source. Natural light can also be used to illuminate the display, and may be collected remotely using a focusing lens and transmitted to the display via fiber optics.

In one embodiment, the light-transmitting panels are lit at an edge or part of an edge. However, the panels may be lit from other surfaces such as a broad surface. In one embodiment, a recess is cut into each panel to receive and support a 2.5 mm thick LED. This may allow more of the light from the LEDs to enter the panel. Because LEDs emit light with relatively high directionality, angling the LED within the plane of the panel (i.e., left or right) can affect which designs or portions of the designs are lit thereby. Depending upon the intended display or effects, the LEDs used can be selected to have narrower or wider beams.

Light sources 5, 7, 9, 11, 13 may be of different colors such that lighting a single or multiple layers provides visual effects by changing color on a layer or using multiple colors on a layer. For example, use of red, green and blue light sources, or a single RGB light source, can produce substantially infinite color variations. These can be controlled a lighting controller external to the display, or by preprogrammed circuitry within the display. In one embodiment, each LED has its intensity controlled by an Integrated Circuit (IC) chip on the lighting control 15 which pulses the signal to the LED to produce nearly infinite colors.

In another embodiment, a reflective material such as reflective tape or a rigid mirrored surface is used to cover the edges of the light-transmitting panels to retain light within the panels. Where recesses are made for LEDs as described above, there is a convenience in taping "straight" across the edge, which has a collateral benefit of reflecting stray light from the LED so as to prevent such light from escaping the panels at the edge thereof.

Figure 2:
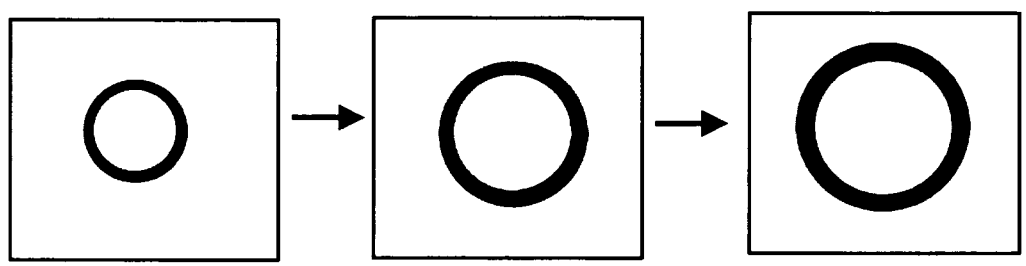
FIG. 2 is a first sequence of images representing the appearance of the display unit over time.
Figure 3:
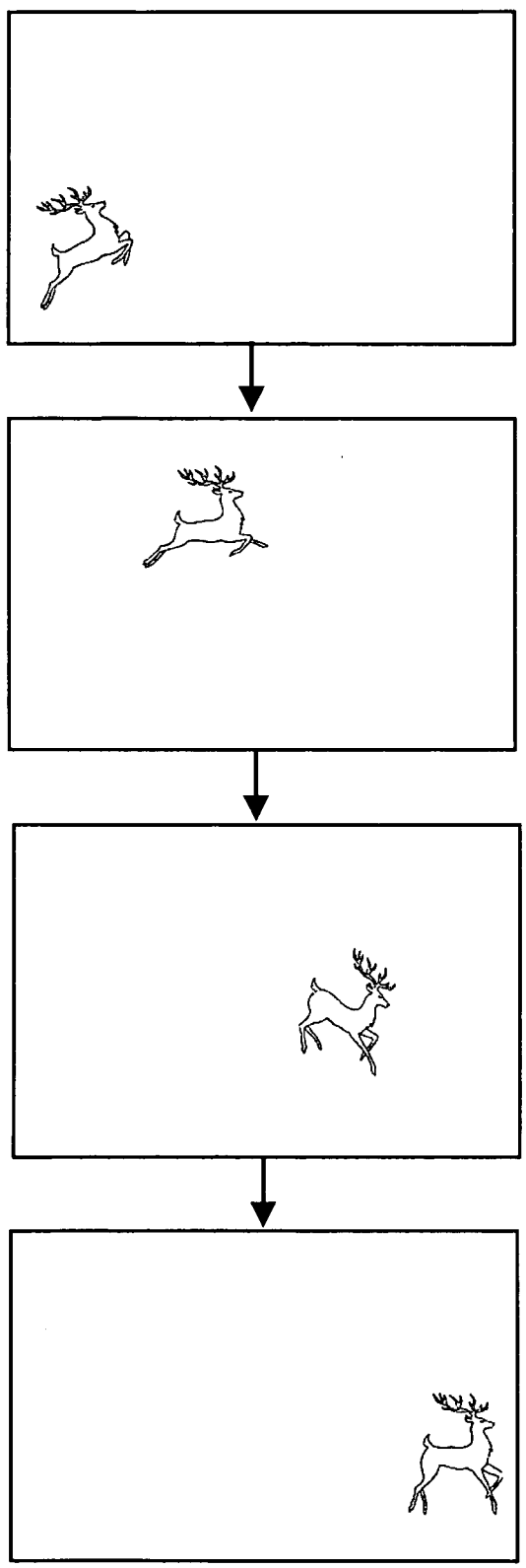
FIG. 3 is a second sequence of images representing the appearance of the display unit over time.
Figure 4:
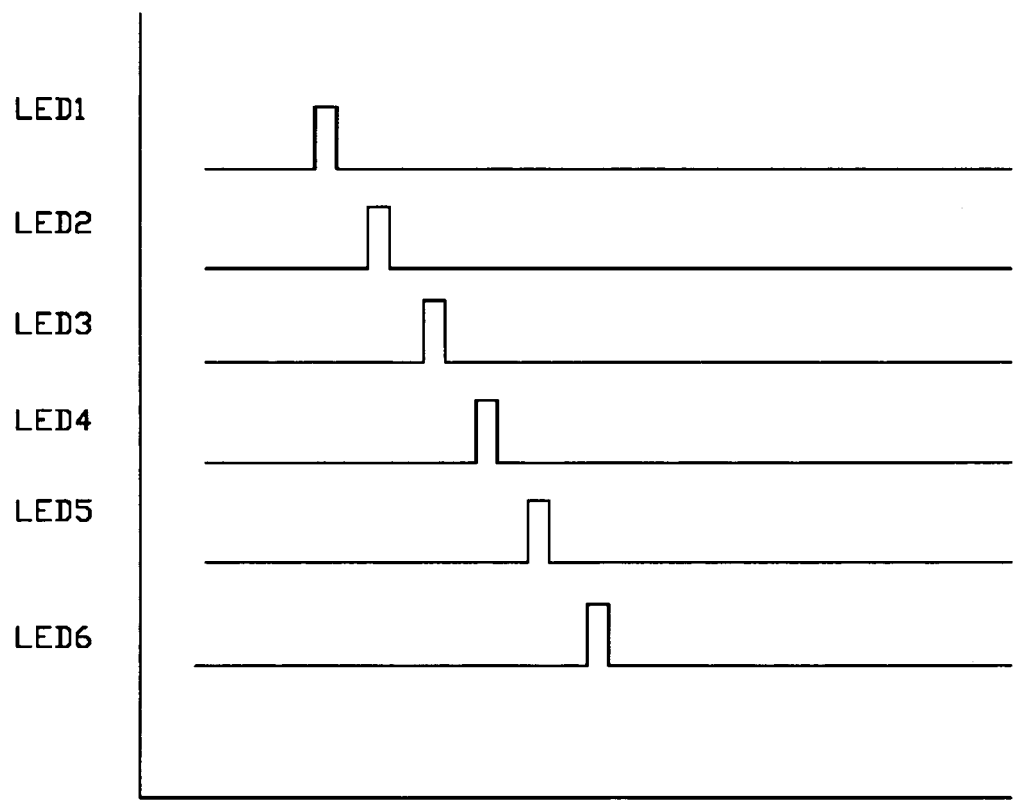
FIG. 4 is a diagram illustrating a series of pulses over time as used to actuate a corresponding series of LEDs.
Figure 5:
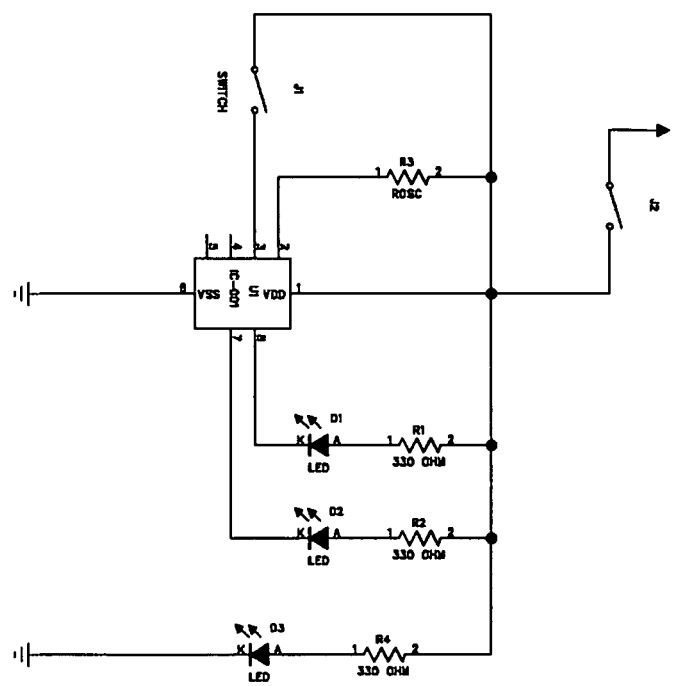
FIG. 5 is a schematic diagram illustrating circuitry for controlling sequential actuation of LEDs in accordance with an embodiment of the invention.
Figure 6:
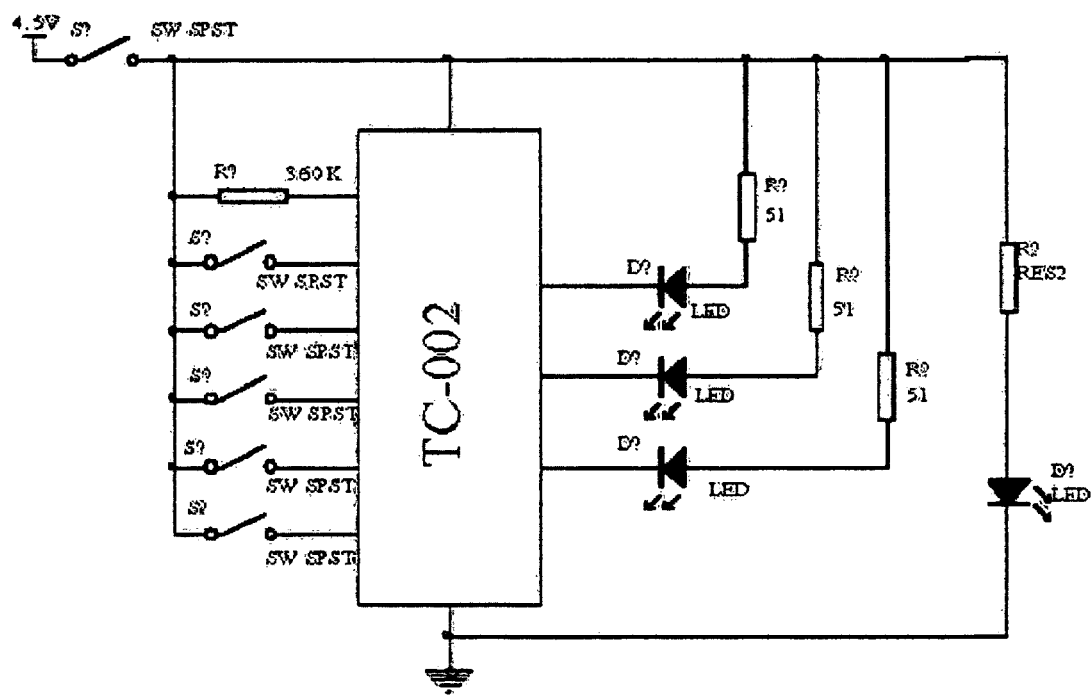
FIG. 6 is a schematic diagram illustrating an IC chip and associated circuit for controlling sequential actuation of LEDs in accordance with an embodiment of the invention.

Visual effects are provided by sequencing the edge lighting between the layers to create an illusion of motion or highlights between designs on each panel. Ambient lighting may provide shadowing that can be affected by panel spacing. FIG. 2 is a first sequence of images representing the appearance of the display unit of FIG. 1 over time. By sequencing the actuation of the LEDs, graphical design 1 on panel 10 is first displayed, then graphical design 2 on panel 20 is displayed, and finally graphical design 3 on panel 30 is displayed. This sequencing creates a motion effect. In this example, the graphical design appears to grow over time. FIG. 3 shows another sequence of images displayed by the display unit over time. In this example, the sequencing creates the appearance of a deer leaping. Sequencing is provided by the controller 15 (FIG. 1), which sends a series of pulses to actuate the LEDs. FIG. 4 is a diagram illustrating such a series of pulses over time. FIG. 5 shows a schematic diagram illustrating a circuit which can be used to implement the controller. FIG. 6 is a schematic diagram illustrating an IC chip and associated circuit for controlling sequential actuation of LEDs.

While light from a single light source may be used to illuminate a single panel, light from light sources associated with different panels can also be combined to produce various visual effects. In this respect, such light sources can be separately controlled and illuminated to create visual effects such as motion, color blending, three-dimensional appearance, highlighting, and blinking on one or more panels. This method can also provide random twinkling effects, sequential images, sequential coloring, fading images from one color to another within a panel. Furthermore, light colors can have separate switches, separate dimmers, timers, and fading elements.

Multiple messages on multiple panels can be displayed. For example, each panel can display an independent message, such as a "STOP" on a red octagonal field; a yellow triangular field with a "Yield"; and a green circular field with a "GO" field on it. Lighting of the three panels can be manually switched from one to another, or controlled by a timer chip that switches them continually, or to either display "STOP" or "GO", or to switch between them automatically in a manner similar to used in stop lights.

In yet another embodiment, the panels are lit by white light through colored filters on the edges of the panels. In this manner, a common light source can be used to illuminate several colors. A shutter, e.g. an LCD panel or a rotating wheel and slit, can be used to control the appearance of motion.

Turning now to FIGS. 7, 7A, 7B and 7C, an illustration of a morphing according to one embodiment of the present invention is shown. Lower and upper display panels 701, 702 are layered and oriented to overlay the skull relief 720 with the ghoul relief 730. LEDs 705, 707, 709, 711, 713 are controlled by circuit 715. A power supply (not shown) provides power for the LEDs and the circuit. Skull relief 720 is a relief in the lower panel 701, and can be illuminated by the LEDs 707, 711 associated with the lower panel 701. Ghoul relief 730 is a relief in the upper panel 702, and can be illuminated by the LEDs 705, 709, 713 associated with the upper panel 702. In an embodiment, circuit 715 gradually changes the relative intensity of the LEDs in the lower panel with respect to the LEDs in the upper panel to create a morphing effect. The morphing effect may morph from the skull relief 720 to the ghoul relief 730.

Turning now to FIGS. 8 and 8A, an illustration of an embodiment of the invention combination of differing visual effects. Rain display panel 801, haunted house display panel 802 and lightning display panel 803 are layered and oriented to overlay the rain 811, haunted house 812 and lightning 813. LEDs 805, 807 and 809 are controlled by circuit 815. A power supply (not shown) provides power for the LEDs and the circuit. Lightning 807 is a relief in the lightning panel 803 which is oriented behind the haunted house 812 in the haunted house display panel 802, which itself is behind the rain 811 in the rain display panel 801. The lightning 807 can be illuminated by LED 807 associated with the lightning panel 803. The haunted house 812 may be illuminated by LED 809 associated with the haunted house panel 802. In one embodiment, the haunted house 812 is not illuminated, and may be a black printed drawing that becomes silhouetted collaterally by the illumination of LED 807. Rain 811 may be illuminated by LEDs 805, which can be illuminated in unison, or sequentially or otherwise to form a sheeting or other effect. In an embodiment, circuit 815 may operatively change the relative intensity of the LEDs 805, 807, 809 to produce various visual effects.

Turning next to FIGS. 9, 9A, 9B and 9C, an illustration of an embodiment of the invention producing color fading or blending effect. The ornaments 921, 922 and 923 are reliefs in the panels 901, 902 and 903 respectively. The panels 901, 902 and 903 are layered and oriented to overlay the ornaments 921, 922 and 923. LEDs 905, 907, 909, 911 and 913 are controlled by a circuit 915. A power supply (not shown) provides power for the LEDs and the circuit. In an embodiment, the ornament 921 is principally illuminated by illuminating LEDs 905 and 909, the ornament 922 is principally illuminated by illuminating LEDs 911 and 913, and the ornament 923 is principally illuminated by illuminating LED 907. In an embodiment (not shown) an ornament may be provided that is not principally illuminated by an LED, and may, but need not be illuminated collaterally by the illumination of another ornament. In an embodiment, LEDs 905 and 909 provide blue light, LEDs 911 and 913 provide green light, and LED 907 provides red light. In an embodiment, circuit 915 changes the relative intensity of the LEDs 905, 907, 909, 911 and 913 to create color fading and/or color blending effects. In addition to being on and off, the LEDs 905, 907, 909, 911 and 913 can be pulsed (rapidly switched on and off) to alter the apparent intensity.

In one embodiment, LED 907 may be illuminated while the remaining LEDs are not; then LED 907 may be gradually and steadily dimmed (by pulsing) until it is off over a period of five seconds. During that same five second period, LEDs 905, 909, 911 and 913 may all be gradually, and steadily illuminated (again by pulsing) to produce the effect of an illuminated ornament having a blended blue-green color that gradually fades in while the preexisting red color thereof fades out. It will be apparent to one of skill in the art that an almost infinite range of color blending and fading is possible using the red, green and blue LEDs. Although only five LEDs are shown in this illustrative embodiment, it is within the scope of the invention to include fewer or more LEDs, the position of which may be selected to enhance various parts of the relief. Moreover, it is within the scope of this invention to incorporate multiple colored LEDs, including for example, red, green and blue LEDs on each panel, thus permitting the illumination of any layer of the display to comprise substantially any color in substantially any intensity.

Turning next to FIGS. 10, 10A, 10B and 10C, an illustration of an embodiment of the invention producing three-dimensional effects and color fading or blending effects. The ornaments 1021, 1022 and 1023 are reliefs in the panels 1001, 1002 and 1003 respectively. The panels 1001, 1002 and 1003 are layered and oriented to overlay the ornaments 1021, 1022 and 1023. LEDs 1005, 1007, 1009, 1011 and 1013 are controlled by a circuit 1015. A power supply (not shown) provides power for the LEDs and the circuit. In an embodiment, the polka dot relief 1021 is principally illuminated by illuminating LEDs 1005 and 1009, the ornament 1022 is principally illuminated by illuminating LEDs 1011 and 1013, and the ornament 1023 is principally illuminated by illuminating LED 1007. In an embodiment, LEDs 1005 and 1009 provide blue light, LEDs 1011 and 1013 provide green light, and LED 1007 provides red light. In an embodiment, circuit 1015 changes the relative intensity of the LEDs 1007, 1011 and 1013 to create color fading and/or color blending effects. LEDs 1005 and 1009 may be illuminated in one or changing intensity to provide a three-dimensional effect and/or color fading and/or color blending effects In addition to being on and off, the LEDs 1005, 1007, 1009, 1011 and 1013 can be pulsed (rapidly switched on and off) to alter the apparent intensity. As with the description above, it will be apparent to one of skill in the art that an almost infinite range of color blending and fading is possible using the red, green and blue LEDs. Similarly, only five LEDs are shown in this illustrative embodiment, but it is within the scope of the invention to include fewer or more LEDs, the position of which may be selected to enhance various parts of the relief. Moreover, it is within the scope of this invention to incorporate multiple colored LEDs, including for example, red, green and blue LEDs on each panel, thus permitting the illumination of any layer of the display to comprise substantially any color in substantially any intensity.

Figure 11:
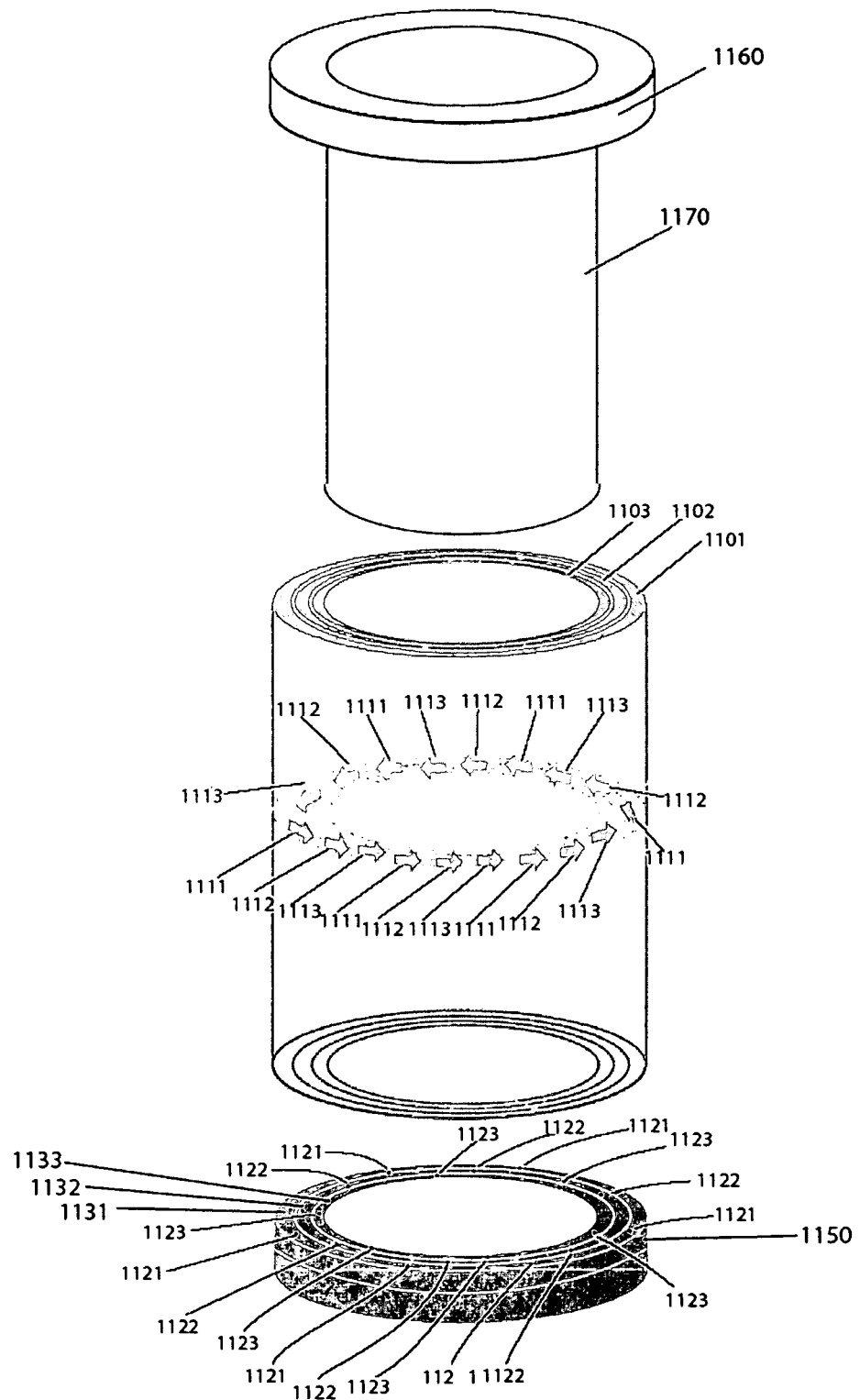
FIG. 11 is yet another illustration of an embodiment of the invention where the lighted display is used as a drink holder.

Turning now to FIG. 11, a set of three concentric curved panels 1101, 1102, 1103 are shown. Arrows 1111, 1112 and 1113 are reliefs in panels 1101, 1102 and 1103, respectively. Base 1150 has grooves 1131, 1132 and 1133 conformed to accept an edge of the panels 1101, 1102 and 1103, respectively. LEDs 1131, 1122 and 1123 are located in the base 1150 beneath the grooves 1131, 1132 and 1133, respectively. A circuit and power supply (not shown) illuminate the LEDs in a variety of manners according to an embodiment of the invention. In an embodiment, the arrows 1111, 1112 and 1113 can be illuminated as "chase" lighting by LEDs 1131, 1122 and 1123, respectively. The LEDs within one groove may all be operated simultaneously, but it is also within the scope of the invention to operate each of the LEDs independently from one another, thus permitting, in an embodiment, having a single arrow chase around the display. In an embodiment, the base 1150 removably accepts the panels 1101, 1102 and 1103. In an embodiment, panels 1101, 1102 and 1103 are securely affixed within the grooves 1131, 1132 and 1133. In such latter embodiment, the circuit and power supply, and optionally the LEDs may be removably attached to the base 1150 so that they can be removed for cleaning. The innermost panel 1103 forms a cavity that may be used as a cup, glass or bottle holder, or directly as a vessel itself, such as being used as a cup, vase, bowl or other vessel. Although this illustration shows chase effect, arrows, any of a variety of animations, 3D effects, color fading, color blending may be done without departing from the scope of the invention. Similarly, although arrows are illustrated for the relief, any type of relief may be used, including, without limitation, seasonal images, corporate trademarks or other logos, illustrations, text, graphics, reliefs of photographs, or any other type of relief.

In an embodiment, the display of FIG. 11 optionally comprises a top 1160 that has grooves (not shown) conformed to accept another edge of the panels 1101, 1102 and 1103. The top 1160 may provide additional stability for the panels 1101, 1102 and 1103. In an embodiment, grooves in the top 1160 removably accepts the panels 1101, 1102 and 1103. In an embodiment, the panels 1101, 1102 and 1103 are securely affixed within the grooves of top 1160. Top 1160 may additionally comprise an insert 1170 removably or fixedly attached thereto. In an embodiment, the insert 170 may be a liquid retaining insert such as a plastic cup or other vessel. In an embodiment, the insert 170 may also comprise an insulating layer (not shown). In an embodiment, an insulating layer is placed between the panel 1103 and the insert 1170.

In an embodiment, the panels 1101, 1102 and 1103 are produced in such shapes and sizes that they are closely nested, and either no gap or only a small gap exists between them. In an embodiment, a larger gap is provided. Where a sufficient gap is provided, the gap may be used as a space to locate filters that can provide colors. In an embodiment where a base 1150 and top 1170 may form a sufficient seal with one or more of the panels 1101, 1102 and 1103, a liquid, powder, or particulate (e.g., confetti, sand) may be placed within the gap. Liquids may be provided with a suspense that can provide lighting effects or, for example, may provide effects when the display is moved or shaken.

In another embodiment (not shown) nested panels may be used that have, for example, triangular, oval, square, rectangular, pentagonal, sextagonal, septagonal, octoganal or other cross sections. For example, a four sided panel having a square cross section may be provided that could look like nested boxes. The core of such a display may be solid, or can be empty or filled with a light conductive, or non-light conductive material (e.g., water, oil, sand, plastic, acrylic, or otherwise.) Such a display may be designed to "frame" its contents so that it can act as a light-framed display case, for example, for a collectible such as an autographed baseball.

Although described above in the context of multiple panels, in an embodiment, a single unit of light-transmitting material may be used to carry out the present invention. Such single unit, or panel, may comprise reliefs etched on any surface, or etched within, such as, and without intending to limit the scope of the invention, by laser etching. In such an embodiment, a plurality of LEDs may be used to illuminate the various etchings. In this single-panel embodiment, light is directed from the light emitting diodes in the direction of one or more of a plurality of etchings. For example, and without intending to limit the scope of the invention, a fist and second etching may be etched on each of two opposing surfaces of a panel. A first and second LEDs may be used as the primary source of illumination for each of the first and second, respectively, although some light may bleed from one light source to an etching for which it is not the primary source of illumination. Additional LEDs may be further used to provide additional illumination or colors. The design of such a mutli-layer presentation system may be further enhanced by adjusting the position and aim of the plurality of directional the LEDs at the time of manufacture.

In another embodiment, without intending to limit the scope of the invention, a fist and second etching may be etched on each of two opposing surfaces of a panel, and a third etching can be etched (for example) in the panel material between the first and the second etching. A first, second and third LEDs may be used as the primary source of illumination for each of the first, second and third etchings, respectively, although some light may bleed from one light source to an etching for which it is not the primary source of illumination. Additional LEDs may be further used to provide additional illumination or colors. The design of such a mutli-layer presentation system may be further enhanced by adjusting the position and aim of the plurality of directional the LEDs at the time of manufacture.

In an embodiment, a cube of light-transmitting clear plastic material is formed. As an example, a plurality of cityscape-like building shapes may be etched on a first surface, and primarily illuminated using a variety of colored LEDs to provide various colors for the buildings. As part of the example, a distant landscape may be etched on a second surface, the second surface being opposed to the first surface. The distant landscape can be primarily illuminated by one or more colored LEDs to provide an aesthetically pleasing background. A third etching may be done using, for example, a laser etching process, the third etching being done wholly within the cube such that the illuminable elements of the etching could appear as lights within the windows of the cityscape building elements. Additional elements that could be added to the third etching are, for example, a moon shape or stars. One or more LEDs can illuminate the moon and the lights of the third etching. In an embodiment, the moon and various groupings of the lights could be selectively illuminated by a primary illumination source. The city lights in the multi-layer presentation could then be selectively turned on and off, for example, automatically. Similarly, the stars could be made two exhibit effects such as twinkling.

In yet another embodiment, a skull design is laser etched within a cube of light-transmitting clear plastic material. A brain design is further etched within the skull, also within the cube. Various LEDs are used to illuminate the skull and brain independently within the cube. In an embodiment, a motion or noise sensor is used to alter the display, such as by illuminating on or flashing the brain design in response to some stimulus. In an embodiment the above skull and brain design further has a human head etched outside of the skull, but within the cube. In an embodiment, the head may be illuminated in a manner that could substantially prevents seeing the skull or the brain designs when the head is illuminated. It will be apparent to one of skill in the art that varying the intensity and colors can produce a variety of visual effects.

In still another embodiment, a solid or hollow shape of light-transmitting material is used. In one embodiment, one or more concentric cylinders are provided with one or more reliefs that are lighted from the one or both ends of the cylinder. For example, a cylindrical can or cup holder, or a cup itself, may be formed in the manner described herein. Various reliefs can be illuminated, including in a chasing arrangement such as arrows or dots continuously circling the cylinder. Color or monochromatic logos or other designs may also, or alternatively be illuminated using the relief/LEDs and a timing circuit according to the descriptions herein. The use of multiple concentric cylindrical or conic-section light-transmitting shapes may be used to produce numerous varieties of effects, including for use as promotional cup, can or bottle holders and/or bowls, vessels, vases, and seasonal décor.

In an embodiment, solid shapes of light-transmitting material may be used. In combination with modern three-dimensional reliefing techniques, reliefs can be formed partially, or wholly within the shape. Applying the techniques taught herein LEDs can be used to create a variety of effects on such reliefs.

Turning next to FIGS. 12, 12A, 12B, 12C and 12D, an illustration of an embodiment of the invention for use as a coaster or other horizontal surface is shown. The ornaments 1221, 1222 and 1223 are reliefs in the panels 1201, 1202 and 1203 respectively. The panels 1201, 1202 and 1203 (shown separately in FIGS. 12A, 12B and 12C) are layered and oriented to position the ornaments 1221, 1222 and 1223 in a desired manner (shown assembled in FIG. 12, and a top view in FIG. 12D). LEDs 1205, 1206 and 1207 may be controlled by a circuit (not shown) housed in a frame (not shown). The LEDs 1205, 1206, 1207 may, but need not be embedded within the panels 1201, 1202 and 1203, respectively. In an embodiment, the LEDs 1205, 1206, 1207 are not embedded within the panels 1201, 1202 and 1203, but rather, illuminate the ornaments 1221, 1222 and 1223 by providing light incident upon the edges of the panels. A power supply (also not shown) provides power for the LEDs and the circuit. In an embodiment, the ornament 1221 is principally illuminated by illuminating LED 1205, the ornament 1222 is principally illuminated by illuminating LEDs 1206, and the ornament 1223 is principally illuminated by illuminating LED 1207. In an embodiment (not shown) an ornament may be provided that is not principally illuminated by an LED, and may, but need not be illuminated collaterally by the illumination of another ornament.

In an embodiment, LED 1205 provides blue light, LED 1206 provides green light, and LED 1207 provides red light. In an embodiment, the circuit (not shown) changes the relative intensity of the LEDs 1205, 1206 and 1207 create color fading and/or color blending effects. In addition to being on and off, the LED 1205, 1206 and 1207 can be pulsed (rapidly switched on and off) to alter the apparent intensity.

In one embodiment, LED 1207 may be illuminated while the remaining LEDs are not; then LED 1207 may be gradually and steadily dimmed (by pulsing) until it is off over a period of time. During that same period, LEDs 1205 and 1206 may be gradually, and steadily illuminated (again by pulsing) to produce the effect of an illuminated ornament having a blended blue-green color that gradually fades in while the preexisting red color thereof fades out. It will be apparent to one of skill in the art that an almost infinite range of color blending and fading is possible using the red, green and blue LEDs.

Although only one LED is shown for each of three panels in this illustrative embodiment, it is within the scope of the invention to include fewer or more LEDs, the position of which may be selected to enhance various parts of the relief, and to add fewer or more panels. Moreover, it is within the scope of this invention to incorporate multiple colored LEDs, including for example, red, green and blue LEDs on each panel, thus permitting the illumination of any layer of the display to comprise substantially any color in substantially any intensity.

In an embodiment, one or more additional LEDs (not shown) are placed in one or more of the panels 1201, 1202 and 1203 to create additional or varied lighting or lighting effects. In an embodiment three LEDs, one red, one green, one blue, are located on each of the panels 1201, 1202 and 1203. Such an embodiment provides flexibility for generating substantially any color or color effect on any panel with LEDs so located. In an embodiment, three LEDs, one red, one green, one blue, are located two or more of the four edges of one or more of the panels. It will be apparent to one of skill in the art that such an embodiment provides vast flexibility in color and brightness effects, as well as multi-color effects.

The panels 1201, 1202 and 1203 may be gapped. In one embodiment, the panels 1201, 1202 and 1203 are spaced apart between approximately 0.5 and 3 mm. The gapping may be accomplished using standoffs or fittings associated with the frame (not shown), or by inserting transparent or non-transparent materials between the panels 1201, 1202 and 1203. A switch (not shown) may be used to turn illumination on or off, or to select between various illumination modes.

The coaster or horizontal surface formed from the panel 1203 can be used to support a vessel 1209 such as a glass, cup, can, bottle or vase. In an embodiment, a sensor (not shown) is activated by placing a vessel 1209 upon the horizontal surface, which sensor causes the system to illuminate, or to change illumination or patterns of illumination. The sensor may be a switch, or a pressure sensor, or a light sensor, or other kind of sensor. In an embodiment, the weight of a largely full vessel 1209 will cause the coaster to illuminate the ornaments 1221, 1222 and 1223. In an embodiment, the weight a near empty vessel 1209 may additionally, or alternatively, cause the coaster to flash LED 1206, thus creating a flashing ornament 1221 indicating a near empty vessel 1209. In addition, or alternatively, the weight a near empty vessel 1209 may cause the coaster to extinguish LEDs 1206 and 1207. Other combinations will be apparent to one of ordinary skill once understanding the present invention.

In an embodiment, the bottom panel 1203 of the coaster is provided with an opaque, partially opaque or reflective or partially reflective surface on its bottom side. The bottom of bottom panel 1203 may be painted, silk-screened or otherwise adorned for further effect. In an embodiment an additional panel (not shown) such as an opaque, translucent or reflective or partially opaque, translucent or reflective panel is provided to give the coaster a "bottom" layer that prevents, or changes, the view of the surface below the coaster.

In an embodiment, a timer (not shown) is associated with the sensor. The timer can be used to turn off the coaster's LEDs after a period of the sensor being inactive. The timer can also be used, in combination with the circuit, to develop a moving average or other calculation that can detect the state (e.g., emptiness or fullness) of the vessel 1209 even though the vessel 1209 is taken from, and placed on the coaster.

Turning next to FIGS. 13, 13A, 13B, 13C, 14A, 14B and 14C, an illustration of an embodiment of the invention for use as a table or other horizontal surface is shown. A table 1388 includes a stand 1387 and a base 1386. As illustrated, coasters 1371 may sit atop the table surface 1403. Panels 1401 and 1402 are below panel 1403 as illustrated in FIG. 13. The ornaments 1421, 1422 and 1423 are each reliefs in one or both surfaces of the panels 1401, 1402 and 1403 respectively. In an embodiment, the ornaments 1421, 1422 and 1423 are reliefs in the lower surface (as oriented with respect to the table) of the panels 1401, 1402 and 1403 respectively. The panels 1401, 1402 and 1403 (shown separately in FIGS. 14A, 14B and 14C) are layered and oriented to position the ornaments 1221, 1222 and 1223 in a desired manner (shown assembled in FIG. 13, and in various states of illumination FIGS. 13A, 13B and 13C). LEDs 1405, 1406 and 1407 may be controlled by a circuit (not shown) housed in the table 1388, or elsewhere. The LEDs 1405, 1406, 1407 may, but need not be embedded within the panels 1401, 1402 and 1403, respectively. In an embodiment, the LEDs 1405, 1406, 1407 are not embedded within the panels 1401, 1402 and 1403, but rather, illuminate the ornaments 1421, 1422 and 1423 by providing light incident upon the edges of the panels. A power supply (also not shown) provides power for the LEDs and the circuit. In an embodiment, the ornament 1421 is principally illuminated by illuminating LED 1405, the ornament 1422 is principally illuminated by illuminating LEDs 1406, and the ornament 1423 is principally illuminated by illuminating LED 1407. In an embodiment (not shown) an ornament may be provided that is not principally illuminated by an LED, and may, but need not be illuminated collaterally by the illumination of another ornament.

In an embodiment, LED 1405 provides blue light, LED 1406 provides green light, and LED 1407 provides red light. In an embodiment, the circuit (not shown) changes the relative intensity of the LEDs 1405, 1406 and 1407 to create color fading and/or color blending effects. In addition to being on and off, the LEDs 1405, 1406 and 1407 can be pulsed (rapidly switched on and off) to alter the apparent intensity.

In one embodiment, LED 1407 may be illuminated while the remaining LEDs are not; then LED 1407 may be gradually and steadily dimmed (by pulsing) until it is off over a period of time. During that same period, LEDs 1405 and 1406 may be gradually, and steadily illuminated (again by pulsing) to produce the effect of an illuminated ornament having a blended blue-green color that gradually fades in while the preexisting red color thereof fades out. It will be apparent to one of skill in the art that an almost infinite range of color blending and fading is possible using the red, green and blue LEDs.

Although only one LED is shown for each of three panels in this illustrative embodiment, it is within the scope of the invention to include fewer or more LEDs, the position of which may be selected to enhance various parts of the relief, and to add fewer or more panels. Moreover, it is within the scope of this invention to incorporate multiple colored LEDs, including for example, red, green and blue LEDs on each panel, thus permitting the illumination of any layer of the display to comprise substantially any color in substantially any intensity.

In an embodiment, one or more additional LEDs (not shown) are placed in one or more of the panels 1401, 1402 and 1403 to create additional or varied lighting or lighting effects. In an embodiment three LEDs, one red, one green, one blue, are located on each of the panels 1401, 1402 and 1403. Such an embodiment provides flexibility for generating substantially any color or color effect on any panel with LEDs so located. In an embodiment, three LEDs, one red, one green, one blue, are located two or more of the four edges of one or more of the panels. It will be apparent to one of skill in the art that such an embodiment provides vast flexibility in color and brightness effects, as well as multi-color effects.

The panels 1401, 1402 and 1403 may be gapped. In one embodiment, the panels 1401, 1402 and 1403 are spaced apart between approximately 0.5 and 3 mm. The gapping may be accomplished using standoffs or fittings associated with the table 1388, or by inserting transparent or non-transparent materials between the panels 1401, 1402 and 1403.

The horizontal table surface formed from the panel 1403 can be used to support the type of things often placed on a table 1388. In an embodiment, a bar table is used to support such items (not shown) as coasters, glasses, cups, cans, bottles or other vessels or items. In an embodiment, a sensor (not shown) is activated by placing weight upon the panel 1403. The activation of the sensor may cause the system to illuminate, or to change illumination or patterns of illumination. The sensor may be a switch, or a pressure sensor, or a light sensor, or other kind of sensor. In an embodiment, a force incident on the panel 1403 or at part thereof may cause the illumination of ornaments 1421, 1422 and 1423. Different forces or locations of force can be used to key changing levels or colors of illumination. Other combinations will be apparent to one of ordinary skill once understanding the present invention.

Turning now to FIGS. 15, 15A, 15B, 15C, 16, 16A, 16B, 16C, 17A, 17B and 17C, an illustration of an embodiment of the invention for use as a lighted display 1500. Such lighted display 1500 can be stationary, or mobile in an application such as atop a taxi. In an embodiment, a two sided lighted display 1500 comprises three panels 1701, 1702 and 1703 on each side. In an embodiment, the panels 1701, 1702, 1703 are layered, with one panel 1701 on the inside, one 1702 in the middle, and one 1703 on the outside. The ornaments 1721, 1722 and 1723 are each reliefs in one or both surfaces of the panels 1701, 1702 and 1703 respectively. In an embodiment, the ornaments 1721, 1722 and 1723 are reliefs on the inner surface (as oriented with respect to a two-sided display 1500) of the panels 1701, 1702 and 1703 respectively. The panels 1701, 1702 and 1703 (shown separately in FIGS. 17A, 17B and 17C) are layered and oriented to position the ornaments 1721, 1722 and 1723 in a desired manner (shown assembled in FIG. 15, and assembled but in various states of illumination in FIGS. 15A, 15B, 15C, 16A, 16B and 16C). LEDs (not shown) may be controlled by a circuit (not shown) housed in the lighted display 1500, or elsewhere. The LEDs may, but need not be embedded within the panels 1701, 1702 and 1703. In an embodiment, the LEDs are not embedded within the panels 1701, 1702 and 1703, but rather, illuminate the ornaments 1721, 1722 and 1723 by providing light incident upon the edges of the panels. A power supply (also not shown) provides power for the LEDs and the circuit. In an embodiment, a taxi or other automobile (shown in phantom) provides power. In an embodiment, the ornament 1721 is principally illuminated by illuminating one LED, the ornament 1422 is principally illuminated by illuminating another LEDs, and the ornament 1423 is principally illuminated by illuminating yet another LED. In an embodiment (not shown) an ornament may be provided that is not principally illuminated by an LED, and may, but need not be illuminated collaterally by the illumination of another ornament.

In an embodiment, one LED provides blue light, another LED provides green light, and yet another LED provides red light. In an embodiment, the circuit (not shown) changes the relative intensity of the LEDs to create color fading and/or color blending or other effects. In addition to being on and off, the LEDs can be pulsed (rapidly switched on and off) to alter the apparent intensity.

In an embodiment, one LED may be illuminated while the remaining LEDs are not; then the illuminated LED may be gradually and steadily dimmed (by pulsing) until it is off over a period of time. During that same period, the other LEDs may be gradually, and steadily illuminated (again by pulsing) to produce the effect of an illuminated ornament having a blended blue-green color that gradually fades in while the preexisting red color thereof fades out. It will be apparent to one of skill in the art that an almost infinite range of color blending and fading is possible using the red, green and blue LEDs.

It is within the scope of the invention to include more than one LED in one or more of the panels 1701, 1702, 1703. The position of the one or more LEDs with respect to a panel may be selected to enhance various parts of the relief. It is also within the scope of the invention to provide fewer or more than the three panels illustratively shown. Moreover, it is within the scope of this invention to incorporate multiple colored LEDs, including for example, red, green and blue LEDs on each panel, thus permitting the illumination of any layer of the display to comprise substantially any color in substantially any intensity.

In an embodiment, one or more additional LEDs (not shown) are placed in one or more of the panels 1701, 1702 and 1703 to create additional or varied lighting or lighting effects. In an embodiment three LEDs, one red, one green, one blue, are located on each of the panels 1701, 1702 and 1703. Such an embodiment provides flexibility for generating substantially any color or color effect on any panel with LEDs so located. In an embodiment, three LEDs, one red, one green, one blue, are located two or more of the four edges of one or more of the panels. It will be apparent to one of skill in the art that such an embodiment provides vast flexibility in color and brightness effects, as well as multi-color effects.

The panels 1701, 1702 and 1703 may be gapped. In one embodiment, the panels 1701, 1702 and 1703 are spaced apart by a gap in the range of between 1 and 10 mm. The gapping may be accomplished using standoffs or fittings associated with lighted display 1500, or by inserting transparent or non-transparent materials between the panels 1701, 1702 and 1703.

When mounted to an automobile (shown in phantom) or other moving object, the lighted display may be supported at an angle less than normal to the roadway. In one embodiment, the sides of the lighted display 1500 are at an angle that is between approximately 10 and 20 degrees angled. Although the panels 1701, 1702 and 1703 are illustrated as flat panels, it is within the scope of the invention to form curved panels. In one embodiment, the panels 1701, 1702 and 1703 are straight along the width, but convex along the height. In one embodiment, the panels are formed from curved hemispheric sections (or partial hemispheric sections, that nest within each other, and are thus convex in both width and height. In an embodiment, the panels are hemispheres, and the two-sided lighted display thus forms a ball.

In one embodiment, the innermost surface of the innermost panel 1701 on at least one side of the lighted display 1500 is coated, at least partially with a reflective or opaque surface, or with other adornments, to mitigate light from the other side of the lighted display 1500 being observed from that side. In an embodiment, an panel, which may be reflective, opaque is placed between the two sides of the two-sided lighted display 1500 to mitigate light observation from one side through the other.

In an embodiment, a translucent panel is placed within, but in close proximity to the innermost panel of each side of the lighted display, and an additional light source, such as for example a rotating "police" style light can be placed within the lighted display to produce a background effect for the lighted display 1500.

While the invention has been particularly shown and described with reference to a various embodiments thereof, it will be understood by those skilled in the art that various changes in form and details may be made therein without departing from the spirit and scope of the invention.

The embodiments of the invention in which an exclusive property or privilege is claimed are defined as follows:

1. A lighted multiple panel display unit capable of providing a variety of visual effects, comprising:
    a plurality of substantially flat layered panels made of light transmitting materials;
    at least two of the plurality of substantially flat layered panels being spaced apart such that there is a gap between them;
    each of the plurality of substantially flat panels comprising a relief, wherein the relief is on at least one substantially flat surface of each panel; and
    a plurality of light sources for illuminating at least a portion of the relief of each panel, wherein the central axis of projection of at least one of the plurality of light sources is directionally angled with respect to the broad plane of the substantially flat panel at other than a 90 degree angle, the light sources being actuated in a predetermined sequence such that the reliefs produce a simulated motion visual effect.

2. The panel display unit as claimed in claim 1, further comprising a base, the base housing the plurality of light sources.

3. The panel display unit as claimed in claim 1, wherein a first one of the plurality of layered panels and a second one of the plurality of layered panels are the same shape.

4. The panel display unit as claimed in claim 1, wherein a first one of the plurality of layered panels is nested at least partially within a second one of the plurality of layered panels.

5. The panel display unit as claimed in claim 1, wherein a first one of the plurality of layered panels has a first cross-section, and wherein a second one of the plurality of layered panels has a second cross-section, and wherein the first cross-section and the second cross-section are the same shape.

6. The panel display unit as in claim 1 wherein each of the plurality of light sources is selected from the set consisting of: a light emitting diode (LED), fiber optics, or natural light.

7. The panel display unit as in claim 1 wherein the light transmitting materials is selected from the set consisting of: acrylic, plastic or glass.

8. The panel display unit as in claim 6 wherein the plurality of light sources are LEDs, and at least one of the LEDs is directionally angled within the plane of the panel at other than a 90 degree angle.

9. The panel display unit as in claim 6 wherein the plurality of light sources are LEDs, and wherein at least one panel has three different colored LEDs associated therewith to create a variety of color within the at least one panel.

10. The panel display unit as in claim 9 wherein each LED of the three different colored LEDs has its intensity controlled through an integrated circuit.

11. The panel display unit as in claim 10 wherein the integrated circuit is controlled by pulsing the signal.

12. The panel display unit of claim 1, wherein the first relief includes a first message, and a second relief includes a second message, the panel display further comprising a switch for switching between a display comprising the first message and a display comprising the second message.

13. The panel display unit of claim 12 wherein the switch is configured to be manually controlled.

14. The panel display unit of claim 12 wherein the switch is adapted to be controlled automatically.

15. The panel display unit of claim 1, further comprising a timer for controlling at least one of the plurality of light sources.

16. The panel display unit of claim 1 wherein the plurality of light sources comprise one or more white lights shined through filters into the edge of the panels, the panel display further comprising a shutter adapted to control at least one of the brightness or color of the light sources.

17. The panel display unit as in claim 1 wherein at least one of the plurality of light sources illuminates at least a portion of at least one relief by edge lighting the panel associated with the relief.

18. The panel display unit as in claim 1 wherein the gap is substantially uniform across the at least two of the plurality of layered panels being spaced apart.

19. The panel display unit as claimed in claim 18 wherein the gap is at least 0.1 millimeters.

20. A lighted display capable of providing a visual effect, the lighted display comprising:
    a first display comprising a substantially flat panel formed of light transmitting material, the display including a relief on the substantially flat panel, the relief having a first portion and a second portion, wherein the relief is on at least one surface of the substantially flat panel of the first display;
    a first light for illuminating at least the first portion of the relief;
    a second light for illuminating at least the second portion of the relief;
    wherein the central axis of projection of the first light or the second light is directionally angled within the broad plane of the substantially flat panel at other than a 90 degree angle,
    wherein the first portion of the relief is more brightly illuminated by the first light than the second portion of the relief, and wherein the second portion of the relief is more brightly illuminated by the second light than the first portion of the relief; and
    the first and second lights being illuminated such that the relative brightness of the first portion with respect to the second portion changes over time, thereby creating a simulated motion visual effect.

21. The lighted display of claim 20 wherein the first display comprises a panel, and wherein the panel has a front side and a rear side, the relief being included on the rear side of the panel; the lighted display further comprising a frame having a front side and a rear side, the frame orienting the panel to present a view of the relief through the front side of the panel.

22. The lighted display of claim 21 wherein the panel further comprises a second relief, the second relief being included on the front side of the panel.

23. The lighted display of claim 20 wherein at least one relief is positive.

24. The lighted display of claim 23 wherein the at least one relief that is positive is formed from at least one selected from the set consisting of: printing, stickers, decals or applique.

25. The lighted display of claim 23 wherein at least one relief is negative.

26. The lighted display of claim 25 wherein at least one of the at least one relief that is negative is formed from at least one selected from the set consisting of: etching, engraving, injection molding or sand blasting.

27. The lighted display of claim 26 wherein the at least one of the at least one relief that is negative is of varying depth.

28. The lighted display of claim 20, wherein the first light and the second light are different color lights.

29. The lighted display of claim 20 wherein the display is formed from at least one rectangular block of light-transmitting materials.

30. The lighted display of claim 20 wherein the display is formed from a square block of light-transmitting materials.

31. A lighted display capable of providing a visual effect, the display comprising:
a first display comprising a substantially flat panel of light transmitting material comprising a first relief and a second relief, wherein the first relief or the second relief is on at least one surface of the first display;
a first light illuminating at least a portion of the first relief more brightly than it illuminates any portion of the second relief;
a second light illuminating at least a portion of the second relief more brightly than it illuminates any portion of the first relief; and
the first and second lights being adapted to be illuminated such that at least one characteristic of the relative illumination of the at least a portion of the first relief with respect to the at least a portion of the second relief changes over time, thereby creating a simulated motion visual effect, wherein the central axis of projection of the first light or the second light is directionally angled with respect to the broad plane of the panel at other than a 90 degree angle.

32. The lighted display of claim 31, wherein the at least one characteristic of the relative illumination is selected from the set of: color or brightness.

33. A lighted multiple panel display unit capable of providing a variety of visual effects, comprising:
a plurality of layered, substantially flat panels made of light transmitting materials, each of the plurality of panels having a first and second narrow edge and a first an second broad edge, each of the first and second broad edges being longer than each of the first and second narrow edges;
each of the plurality of substantially flat panels comprising a relief, wherein the relief is on at least one surface of each panel;
a plurality of light sources for illuminating at least a portion of the relief of each substantially flat panel, wherein the central axis of projection of at least one of the plurality of light sources is directionally angled within the plane of the panel at other than a 90 degree angle, the light sources being actuated in a manner such that the reliefs produce a simulated motion visual effect; and
at least one of the plurality of substantially flat panels having the associated relief being illuminated by one or more light sources proximal to the at least one of the first and second broad edges.

34. A lighted multiple panel display unit capable of providing a variety of visual effects, comprising:
a plurality of substantially flat layered panels made of light transmitting materials;
at least two of the plurality of substantially flat layered panels being spaced apart such that there is a gap between them;
each of the plurality of substantially flat panels comprising a relief, wherein the relief is on at least one surface of each panel, wherein at least one relief is formed from at least one selected from the set consisting of: conventional etching, engraving, injection molding, sand blasting, or printing on the surface; and
a plurality of light sources for illuminating at least a portion of the relief of each substantially flat panel, the light sources being actuated in a predetermined sequence such that the reliefs produce a visual effect.

35. A lighted multiple panel display unit capable of providing a variety of visual effects, comprising:
a plurality of layered, substantially flat panels made of light transmitting materials;
at least two of the plurality of layered, substantially flat panels being spaced apart, wherein there is a gap between the at least two of the plurality of layered panels;
each of the plurality of substantially flat panels comprising a relief, wherein the relief is on at least one surface of each panel; and
a plurality of light sources for illuminating at least a portion of the relief of each panel, wherein each of the plurality of light sources is a light emitting diode (LED), wherein at least one of the LEDs is directionally angled within the plane of the substantially flat panel at other than a 90 degree angle, the light sources being actuated in a predetermined sequence such that the reliefs produce a simulated motion visual effect.

36. The lighted display of claim 1 wherein the simulated motion visual effect comprises a color blending effect.

37. The lighted display of claim 1 wherein the simulated motion visual effect comprises a morphing effect.

38. The lighted display of claim 1 wherein the simulated motion visual effect comprises a color fading effect.

39. The lighted display of claim 1 wherein at least some of the plurality of light sources comprise light emitting diodes embedded in at least one of the plurality of layered panels.

40. The lighted display of claim 1 wherein reflective material is used to cover the edges at least one of the plurality of layered panels.

41. The lighted display of claim 1 wherein a first and second etching is etched on each of two opposing surfaces of at least one of the plurality of layered panels.

42. The lighted display of claim 41 wherein a third etching is etched within the at least one of the plurality of layered panels between the first and the second etching.

43. The lighted display of claim 1 wherein the gap is filled with a liquid.

44. The lighted display of claim 1 wherein the simulated motion visual effect comprises a three-dimensional appearance effect.

* * * * *